June 23, 1942.    W. R. WEEKS    2,287,585
COFFEE MAKER
Filed Feb. 7, 1941
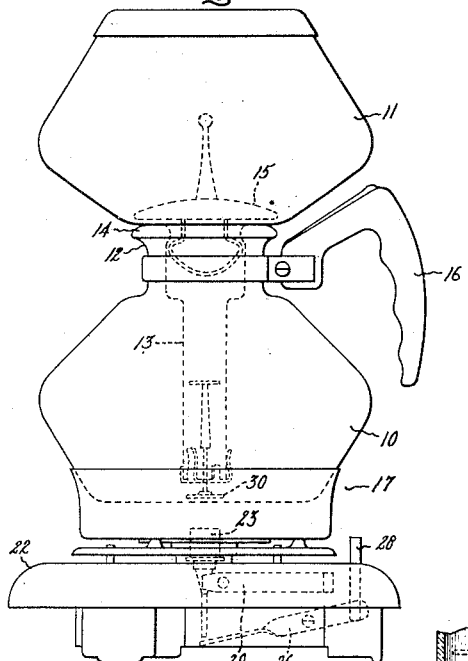
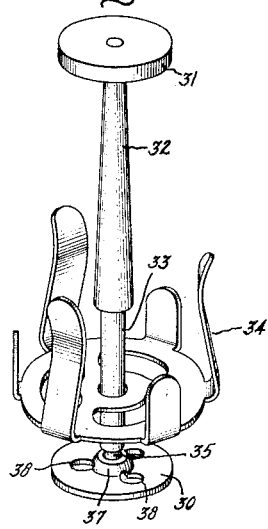
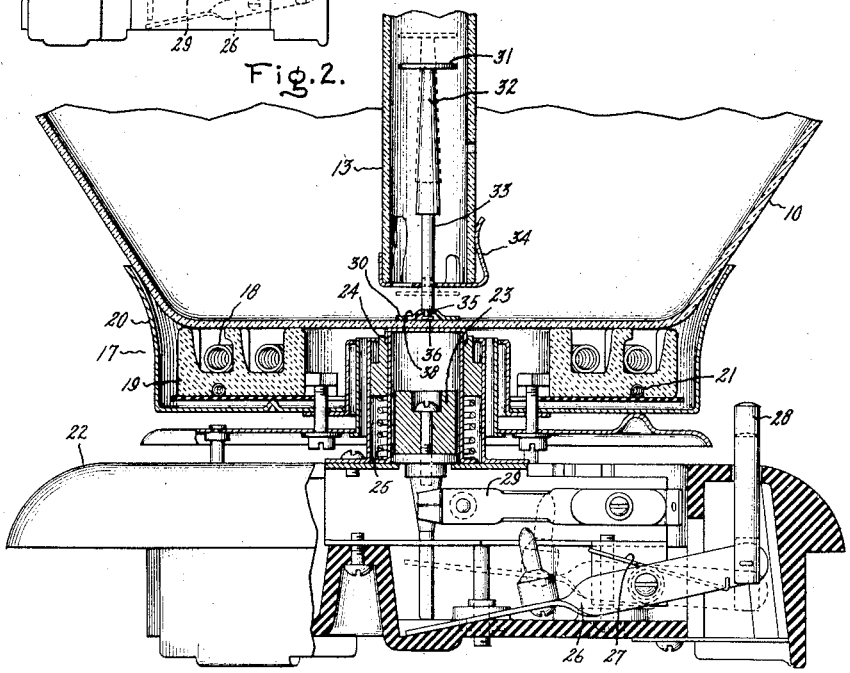
Inventor:
Walter R. Weeks,
by Harry E. Dunham
His Attorney.

Patented June 23, 1942

2,287,585

UNITED STATES PATENT OFFICE 2,287,585

COFFEE MAKER

Walter R. Weeks, Hamden, Conn., assignor to General Electric Company, a corporation of New York Application February 7, 1941, Serial No. 377,887

6 Claims. (Cl. 53—3)

This invention relates to coffee makers, more particularly to coffee makers of the vacuum-type wherein heated water is transferred from a water heating vessel to a coffee infusion vessel where the brew is made, and thereafter the brew is returned to the water heating vessel when the heat applied thereto has been reduced sufficiently, and it has for its object the provision of an improved device of this character.

More specifically, this invention relates to improvements in the automatic vacuum-type coffee maker described and claimed in my copending application, Serial No. 357,256, filed September 18, 1940, and assigned to the same assignee as this invention. As there described, this coffee maker comprises means for automatically reducing the heat applied to the water heating vessel responsively to the transfer of the water from the water heating vessel to the coffee infusion vessel through the liquid transfer tube which connects these vessels. In one specific form of this coffee maker, a magnet is provided in the stove which heats the water heating vessel. This magnet is constructed and arranged to control the stove to reduce the heat applied to the water heating vessel when it is dropped from one position to another. The magnet is held in its upper position by means of an armature located in the water heating vessel. The armature is attached to an actuator which is located in the transfer tube. The actuator is elevated to elevate the armature from the magnet, toward the end of the liquid transfer period, by the action of the rushing water and steam on the actuator. This releases the magnet so as to permit it to fall to its second position and thereby reduce the heat applied to the water heating vessel. After the magnet has fallen and the flow of fluid through the transfer tube to the infusion vessel subsides the armature and actuator fall to their initial positions.

When this occurs, there is a tendency for the armature to flutter due to the generation of steam under it.

It will be understood that not all of the water is transferred to the infusion vessel during the transfer period, but a small quantity remains in the water heating vessel under the lower end of the transfer tube. This residual water will be close to the boiling point at the end of the transfer period. And, even though the heat is turned off, for a time this water will be held at the boiling point by the stored heat in the stove, and, therefore, generate steam.

The steam pressure which builds up under the armature will lift the armature from the bottom wall of the heating vessel to permit the steam to escape into the main body of residual water. When the steam escapes, colder water is drawn back into the space under the armature that was occupied by steam, and this colder water instantly condenses whatever steam remains at the moment, and thereby causes the armature to be pulled down quickly onto the bottom wall. This action is then repeated, and the alternate lifting of the armature by the steam and the pulling of the armature back by the condensation of the steam produces an objectionable chattering noise.

In accordance with this invention, means are provided for allowing the water and steam to circulate freely between the water in the water heating vessel and the space where the steam or water might be confined under the armature. In one specific form of this invention, the armature is provided with vents or openings through which the steam and water can circulate.

For a more complete understanding of this invention, reference should be had to the accompanying drawing in which Fig. 1 is a vertical elevation of an automatic vacuum-type coffee maker arranged in accordance with this invention; Fig. 2 is a fragmentary view mainly in section illustrating parts of the coffee maker of Fig. 1 and drawn to a larger scale than Fig. 1; and Fig. 3 is a perspective view illustrating the armature and its actuator arranged in accordance with this invention, and drawn to larger scales than Figs. 1 and 2.

Referring to the drawing, this invention has been shown in one form as applied to the automatic vacuum-type coffee maker described and claimed in my above-mentioned copending application. As shown, this coffee maker comprises a lower water heating vessel 10 and an upper infusion vessel 11. The lower vessel 10 is provided at its upper end with an upright neck 12 within which a depending liquid transfer tube 13 provided on the lower end of the upper vessel 11 is received. A suitable gasket 14, preferably formed of rubber, is inserted in the neck 12 of the lower vessel and is provided with a centrally arranged aperture to receive the tubular extension 13 provided on the upper vessel. As shown, the lower end of the tubular member 13 terminates just above the bottom wall of the water heating vessel 10. Seated within the bottom of the infusion vessel 11 over the mouth of the transfer tube 13 is a suitable filter 15.

It will be understood that in the operation of this coffee maker, water is placed within the vessel 10, while the coffee grounds are placed within the vessel 11. When the water in the vessel 10 is heated, a pressure is created above the liquid level therein, and eventually this pressure becomes so great that it forces the water through the transfer tube 13 into the infusion vessel 11. This steeps the coffee grounds in this vessel and makes the coffee brew. When the heat is removed from the vessel 10, the water vapor therein condenses and the vacuum thereby created is sufficiently great to cause the coffee brew in the vessel 11 to pass quickly through the filter 15 into the vessel 10. After the brew has been made, the upper vessel may be removed and the coffee poured from the lower vessel. The lower vessel is provided with a suitable handle 16, which is used to tilt the vessel to pour the brew.

The two vessels 10 and 11 are supported by a stove 17. This stove comprises a resistance conductor 18 mounted in a suitable insulating brick 19. This brick in turn is mounted in a pan-like casing 20. Also mounted in the brick 19 is a second heating element 21. This heating element 21, as pointed out in detail in my above-mentioned copending application, is used in a warming circuit after the coffee brew has been returned to the vessel 10.

The casing 20 is mounted upon a suitable base 22. Arranged in the central axis of the stove is a suitable magnet 23, which is mounted for vertical movement in a casing 24. This casing 24 is biased upwardly by means of a compression spring 25 so that its upper wall is pressed firmly against the bottom wall of the vessel 10 when it is placed upon the stove. The magnet 23 is biased to its lower position in which it is shown in Fig. 2 by means of gravity, and it is elevated against the force of gravity by means of a suitable lever 26 pivotally mounted to the base intermediate its ends, as shown. This lever is biased in a counterclockwise direction, as viewed in Fig. 2, to its position in which it is shown in full lines in this figure, by means of a spring 27. A plunger 28 is provided for moving the lever against the force of this spring so as to elevate the magnet 23 in its casing 24.

When the magnet 23 is in its lower position, it spreads switch arms 29 apart so as to prevent the energization of the heating element 18, but when it is elevated, it permits the switch arms to close so as to energize the heating element 18, as fully described in my above-mentioned copending application.

The magnet is maintained in its upper position by means of an armature 30. The armature 30 is arranged to rest upon the bottom wall of the vessel 10 directly above the magnet 23 so that the magnet attracts itself to the armature and holds itself in its upper position as long as the armature rests upon or is very close to the bottom wall of the vessel 10.

The armature 30 is moved upwardly away from the magnet toward the end of the liquid transfer period by means of an actuator 31 which is positioned within the transfer tube 13. The actuator 31 in the particular coffee maker illustrated is of disc-like form. This actuator is rigidly secured to the upper end of a pin 32. This pin 32 at its lower end is provided with a reduced section 33 which is received in an aperture provided for it in a resilient socket 34. The resilient socket is adapted to be fitted to the lower end of the transfer tube, as shown, so as to hold the pin and actuator in assembled relation with the tube. At the extreme lower end of the pin, there is provided a reduced section 35 located between the reduced section 33 and a head 36 provided on the very lower end of the pin. The armature 30 is provided with an upright boss 37 at the center. This boss preferably and as shown is formed by pressing the central area of the armature upwardly from the plane of the armature. This boss is provided with a centrally positioned aperture which receives the reduced section 35 whereby the armature is loosely mounted upon the lower end of the pin. The armature is loosely connected to the pin in this fashion so that it can firmly seat itself upon the bottom wall of the vessel 10 even though the pin 32 be inclined to the vertical axis of the vessel. In other words, the armature may lie flat against the bottom wall of the vessel 10 even though the pin be inclined at a considerable angle to the vertical.

In the operation of the coffee maker, the pressure that is created against the under side of the actuator 31 by the water and steam functions to elevate the actuator to its dotted line position of Fig. 2, and thereby elevate the armature to its dotted line position of this figure, as fully pointed out in my above-mentioned copending application. This action occurs almost at the end of the transfer period when the water is boiling violently and the combined stream of hot water and steam has attained a comparatively high velocity.

When the armature is elevated in this fashion, it releases the magnet 23 which thereupon drops so as to open the switch 29 and thereby deenergize the heating element 18. At the end of the transfer period, the flow of fluid through the transfer tube subsides and the armature and its actuator fall to their initial positions.

As pointed out previously, at this time some water remains in the vessel 10 below the lower end of the transfer tube 13. This water is about at the boiling point and heat continues to be applied to it from the hot stove. Therefore, even though the heat has been turned off, for a time steam will be generated in the space under the armature. This steam will elevate the armature and escape. Thereupon, cooler water will flow in under the armature and condense what steam remains so that the armature will be pulled down against the bottom wall. This action is repeated and causes the armature to repeatedly strike the bottom wall.

To obviate this action and the resulting noise, I provide the armature with a series of vent openings 38 which connect the under surface of the armature and also the interior of the boss 37 directly with the main body of the residual water in the water heating vessel 10. As shown, these openings are passed directly through the armature so as to connect its top and bottom surfaces, and also so as to connect the interior of the boss 37 with the upper or outer surface of the armature. These openings allow the water and steam to circulate freely between the main body of residual water in the vessel 10 and the space where the steam or water might be confined underneath the armature. This obviates the objectionable chattering of the armature and its actuator while the water is in the infusion vessel 11 to steep the coffee grounds.

As pointed out in my copending application in detail, after the magnet 23 has been released at the end of the transfer period, and after the stove has cooled sufficiently to cause the coffee brew to flow into the lower vessel 10, a suitable thermostat (not shown) establishes a warming circuit in which the heating elements 18 and 21 are connected in series.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A coffee maker comprising a water heating vessel, a liquid transfer tube leading from said vessel through which the water is forced when it is heated, means for heating said vessel, a pair of relatively movable cooperating control members for said heating means consisting of a magnet and an armature constructed and arranged to control said heating means to apply heat to said vessel when said members are moved to first predetermined positions relative to each other and to reduce the heat applied when moved to second predetermined positions relative to each other, the magnet functioning to maintain said members in said relative positions, one of said members being mounted in said vessel on its bottom wall and the other outside of the said vessel opposite said one member, means operated responsively to the transfer of liquid from said water heating vessel moving said one member from said wall to cause said members to occupy said second predetermined positions, and said one member being provided with a series of openings therethrough to provide for the circulation of steam and water between the water in said water heating vessel and the space under said one member.

2. In a vacuum-type coffee maker having a water heating vessel, a coffee infusion vessel and a liquid transfer tube between the vessels, an electric stove for applying heat to the bottom wall of said water heating vessel, a magnet on said stove controlling the energizing circuit thereof so that when it is dropped from a first to a second position it reduces the heat applied to said vessel, an armature within said water heating vessel adapted to be positioned on a wall area opposite said magnet so as to hold the magnet in said first position, means for moving said armature to release said magnet to permit it to drop to said second position responsively to the transfer of liquid from said water heating vessel, and said armature having a series of openings therethrough to provide for the circulation of steam and water between the water in said water heating vessel and the space under said armature.

3. In a vacuum-type coffee maker having a water heating vessel, a coffee infusion vessel and a liquid transfer tube between the vessels, an electric stove for applying heat to the bottom wall of said water heating vessel, a magnet on said stove opposite said bottom wall controlling the energizing circuit of said stove so that when the magnet is dropped from a first to a second position it reduces the heat applied to said vessel, an armature within said water heating vessel adapted to be positioned on said bottom wall opposite said magnet so as to hold the magnet in said first position, an actuator for said armature located in said transfer tube constructed and arranged to be moved upwardly in said tube to elevate said armature to release said magnet responsively to the flow of fluid through said tube from said water heating vessel, and said armature having a series of openings therethrough to provide for the circulation of water and steam between the water in said water heating vessel and the space under said armature.

4. In a coffee maker having a water heating vessel, and a liquid transfer tube leading from said vessel, a heater under said vessel for applying heat thereto, a magnet outside of said vessel controlling said heater to reduce the heat applied to said vessel when moved from a first to a second controlling position and said magnet being biased to move to said second position, an armature within said vessel lying on a wall opposite said magnet for holding said magnet in said first position, an actuator for said armature in said transfer tube, a pin having one end secured to said actuator, the other end of said pin being provided with a reduced section and a head that defines a recess in said end, said armature being provided with an upwardly extending boss provided with an opening that is received in said recess so that said head is received in said boss to secure the armature loosely to said pin, and said armature having a series of openings therethrough that provide for the free circulation of water and steam between the water in said water heating vessel and the space under said armature.

5. A coffee maker comprising a water heating vessel, a liquid transfer tube leading from said vessel through which the water is forced when it is heated, heating means for heating said vessel, a control element for said heating means located in said vessel supported on a wall thereof and adapted to be moved from its position on said wall to another position above said wall, control means operating responsively to the movement of said element from said wall to said other position controlling said heating means to reduce the heat applied to said vessel, means operated responsively to the transfer of liquid from said water heating vessel operating said control element to move from said wall to said other position when the major portion of said liquid has been transferred, and said control element having a series of openings therethrough to provide for the circulation of steam and water between the water in said water heating vessel and the space under said element when it is in its position on said wall.

6. A coffee maker comprising a water heating vessel, a liquid transfer tube leading from said vessel through which the water is forced when it is heated, means for heating said vessel, a pair of relatively movable cooperating control members for said heating means consisting of a magnet and an armature constructed and arranged to control said heating means to apply heat to said vessel when said members are moved to first predetermined positions relative to each other and to reduce the heat applied when moved to second predetermined positions relative to each other, one of said members being mounted in said vessel and the other outside of said vessel, means operated responsively to the transfer of liquid from said water heating vessel moving said one member to cause said members to occupy said second predetermined positions relative to each other, and said one member being provided with a series of openings therethrough to provide for the circulation of steam and water between the water in said water heating vessel and the space under said one member.

WALTER R. WEEKS.